United States Patent
Isidorov et al.

(10) Patent No.: US 9,051,623 B2
(45) Date of Patent: Jun. 9, 2015

(54) APPARATUS FOR MELTING A SOLID METAL

(75) Inventors: Eduard Isidorov, Riga (LV); Genadijs Isidorov, Riga (LV); Aleksandrs Isidorovs, Riga (LV)

(73) Assignee: Gors Ltd., Riga (LV)

( * ) Notice: Subject to any disclaimer, the term of this patent is extended or adjusted under 35 U.S.C. 154(b) by 0 days.

(21) Appl. No.: 13/482,442

(22) Filed: May 29, 2012

(65) Prior Publication Data
US 2013/0320602 A1 Dec. 5, 2013

(51) Int. Cl.
*F27D 27/00* (2010.01)
*C22B 7/00* (2006.01)
*F27D 3/00* (2006.01)

(52) U.S. Cl.
CPC .............. *C22B 7/003* (2013.01); *F27D 27/005* (2013.01); *F27D 2003/0054* (2013.01)

(58) Field of Classification Search
CPC .......... F27D 27/005; F27D 2003/0054; C22B 7/003
USPC ......... 75/10.13; 266/900, 237, 234, 233, 236, 266/239; 417/50, 53; 222/590, 594; 164/312, 337
See application file for complete search history.

(56) References Cited

U.S. PATENT DOCUMENTS

| | | | |
|---|---|---|---|
| 3,276,758 A | 10/1966 | Baker et al. | |
| 5,191,929 A * | 3/1993 | Kubota et al. | 164/500 |
| 5,948,138 A | 9/1999 | Issidorov | |
| 7,691,322 B2 | 4/2010 | Peel et al. | |
| 2007/0108673 A1 * | 5/2007 | Peel et al. | 266/233 |
| 2008/0202644 A1 * | 8/2008 | Grassi et al. | 148/538 |

FOREIGN PATENT DOCUMENTS

| | | | | |
|---|---|---|---|---|
| EP | 2206998 | * | 12/2009 | F27D 27/00 |
| GB | 2 072 819 A | | 10/1981 | |
| JP | 03-120322 | * | 5/1991 | C22B 21/00 |
| JP | 3-120322 A | | 5/1991 | |
| WO | 03/023078 A1 | | 3/2003 | |
| WO | 2010/058172 A1 | | 5/2010 | |

OTHER PUBLICATIONS

International Search Report and Written Opinion for Application No. PCT/IB2013/001969 dated Feb. 17, 2014, 10 pages.
Areaux L. D. et al.; Vortex Charge Well With Gas Lift Pump and Gravity Furnace Charger; Jan. 1, 1999, Light Metals 1999, Proceedings of the Technical Sessions Presented by the TMS Annual Meeting, San Diego, CA Feb. 28-Mar. 4, 1999 [Proceeding of the TMS Annual Meeting], Warrendale, PA: TMS, US, pp. 999-1004.

* cited by examiner

*Primary Examiner* — Scott Kastler
*Assistant Examiner* — Michael Aboagye
(74) *Attorney, Agent, or Firm* — Sughrue Mion, PLLC (57) ABSTRACT

An apparatus for melting a solid metal having a vortex chamber disposed within the apparatus, the vortex chamber having an inlet and an outlet, and a molten metal mover configured to move molten metal within the apparatus into the vortex chamber and disposed proximate to the entrance of the vortex chamber.

21 Claims, 7 Drawing Sheets

FIG. 7

APPARATUS FOR MELTING A SOLID METAL

BACKGROUND

1. Technical Field

Aspects of an example embodiment are directed to an apparatus for melting a solid metal, more specifically, a furnace having an electromagnetic pump for vortex generation to melt a solid metal.

2. Description of Related Art

In related art molten metal processing, scrap may be re-melted to prepare metallic alloys (for example, melting scrap aluminum during manufacturing of aluminum or an aluminum-based alloy) One related art problem experienced during re-melting involves the submerging of small or lightweight scrap particles of metal into the molten metal. Related art furnaces combust organic fuel in one or more combustion chambers located above a metal bath containing solid metal pieces and molten metal. However, a problem exists with these related art furnaces, because many metals, such as aluminum, for example, undergo rapid oxidation when in a solid state and having a large amount of surface area (e.g. swarf, foil, chips and so on).

In a related art metal processing apparatus, a charging chamber used to introduce solid materials into a furnace is connected to the furnace by a pair of pipes. One of the pipes is surrounded by an electromagnetic pumping unit (e.g., pump) that causes molten metal to move through the pipes and circulate between the charging chamber and the furnace. The movement of the molten metal through the charging chamber may help accelerate the melting of the solid pieces. However, the related art pipes, charging chamber, and pump are located outside the furnace.

Thus, this related art metal processing apparatus frequently suffers from solidification of the molten metal within the pair of pipes and, in particular, within the portion of the pipe that is surrounded by the pump. If the temperature of the liquid metal drops below the solidification temperature of the metal within the portion of the pipe that is surrounded by the pump, a blockage can occur. If such a blockage occurs, re-melting of the blockage is hindered by the placement of the pump around the pipe, which prevents direct re-application of heat to the pipe.

Clearing of the blockage in the pipe requires removing molten metal from the furnace; cooling down the entire apparatus; disassembling the pump; and removing, cleaning, and replacing the pipe before the furnace can be returned to operating temperatures. As the metal processing is sensitive to operating conditions, these blockage cleaning steps may result in lost operation time of the metal processing apparatus.

Further, even if solidification due to temperature drops in the pipes does not occur, sedimentary build-up of solid impurities on the pipe walls (known as "dross sedimentation") of the pipe section surrounded by the pump causes gradual reduction in flow diameter (i.e., pipe narrowing), which can eventually result in blockage of the pump. The placement of pump around the pipe makes cleaning of the pipe section difficult without disassembly of the pump, resulting in lost operation time of the metal processing apparatus.

Alternatively, some related art systems use a mechanical pump instead of the electromagnetic pumping unit. However, if a mechanical pump is used, the mechanical pump must be in contact with the molten metal, which may cause potentially expensive maintenance including frequent replacement of components of the pump that are submerged in the molten metal (such as the impeller, for example).

SUMMARY

Aspects of example embodiments include an apparatus for melting a solid metal having a vortex chamber disposed within the apparatus, the vortex chamber having an inlet and an outlet, and a molten metal mover configured to move molten metal within the apparatus into the vortex chamber and disposed proximate to the entrance of the vortex chamber.

Aspects of the example embodiments further include the molten metal mover being an electromagnetic pumping unit, and the electromagnetic pumping unit is mounted to a sidewall of the apparatus proximate to the inlet of the vortex chamber.

Additional aspects of the example embodiments are discussed below.

BRIEF DESCRIPTION OF THE DRAWINGS

The accompanying drawings, which are incorporated in and constitute a part of this specification exemplify the example embodiments and, together with the description, serve to explain and illustrate principles. Specifically.

DETAILED DESCRIPTION

In the following detailed description, reference will be made to the accompanying drawing(s), in which similar elements are designated with similar numerals. The aforementioned accompanying drawings show by way of illustration and not by way of limitation, specific example embodiments and implementations consistent with principles of an example embodiment. These implementations are described in sufficient detail to enable those skilled in the art to practice an example embodiment and it is to be understood that other implementations may be utilized and that structural changes and/or substitutions of various elements may be made without departing from the scope and spirit of an example embodiment. The following detailed description is, therefore, not to be construed in a limited sense.

Figure 1:
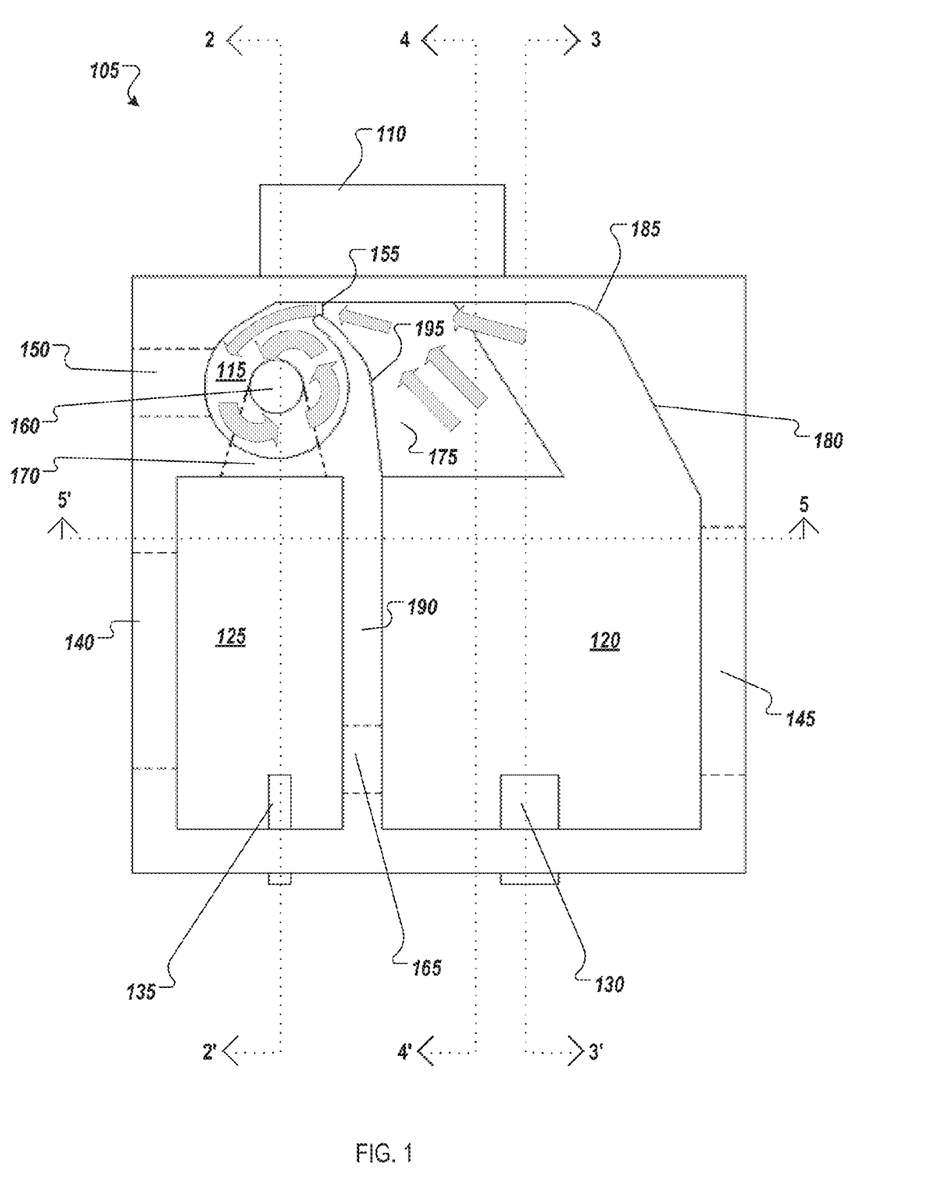
FIG. 1 illustrates a top view of an apparatus according to an example embodiment.

FIG. 1 illustrates a top view of an apparatus (e.g., a furnace) for melting a solid (e.g., metal) according to an example embodiment. In this example embodiment, the apparatus 105 has a substantially rectangular shape with a molten metal mover 110 attached to a side wall of the apparatus. However, the shape of the apparatus is not particularly limited to a rectangular shape and other shapes may be substituted therefor as would be understood by those skilled in the art. Examples of the molten metal mover 110 can include an electromagnetic pumping unit (e.g. a flat inline inductor) or a mechanical pump unit.

An electromagnetic pumping unit moves molten metal based on a linear motor principle. According to this principle, a conductor (such as molten metal) is magnetically repulsed by a magnetic field generated by a coil adjacent to the conductor. More specifically, by positioning a magnetic field perpendicular to a direction of fluid flow and passing a current through the magnetic field a pumping force is applied to the molten metal. Such electromagnetic pumping units generally do not require moving parts. An electromagnetic pumping unit according to an example embodiment may produce a fluid flow that is more of a turbulent nature rather than laminar.

In such an example embodiment, the distribution of flow speed throughout the channel is not uniform. The electromagnetic pumping unit according to an example embodiment (e.g. a flat linear type motor) may work at frequencies between 0 and 60 Hz. However, the working frequency is not limited to 0-60 Hz and other frequencies may be substituted therefor. Further, the power of the example embodiment of the electromagnetic pumping unit may be adjustable to control the amount of liquid metal moved into the vortex chamber 115. In FIG. 1, a flat linear motor type electromagnetic pump is shown as the molten metal mover 110. However, an example embodiment is not particularly limited to a flat linear motor type electromagnetic pump.

In this example embodiment, a vortex chamber 115, inlet chamber 120, and outlet chamber 125 are formed inside the apparatus 105. In some embodiments, the apparatus 105 may include one or more housings that form the vortex chamber 115, inlet chamber 120, and outlet chamber 125. The inlet chamber 120 and outlet chamber 125 are formed adjacent to one another. Further, the vortex chamber 115 is positioned at one end of the outlet chamber 125 and the vortex chamber 115 is positioned adjacent to the inlet chamber 120. However, the arrangement and positioning of the inlet chamber 120, outlet chamber 125 and the vortex chamber 115 is not limited to this arrangement.

A first heating device 130 may be disposed inside of the inlet chamber 120 to heat and melt solid metal within the inlet chamber 120. Further, a second heating device 135 may be disposed inside of the outlet chamber 125 to heat and melt solid metal within the outlet chamber 125. The type of heating device used as the first heating device 130 and as the second heating device 135 is not particularly limited and may include, but is not limited to, a burner, as known to those skilled in the art, for combusting a fuel, or an electric heating element. Additionally, the first and second heating devices can be of the same or different types. A location of placement of the main heating device 130 and the secondary heating device 135 within the inlet and outlet chambers, respectively, is not particularly limited.

A first opening 145 is provided in a wall of the apparatus 105 proximate to the inlet chamber 120 to allow solid metal pieces to be inserted into the inlet chamber 120. The term "pieces" is not limited to any particular size and may include particles, chunks, pieces, portions, etc. (i.e. the size of metal pieces melted within the apparatus is not particularly limited and may range from metal powders to very large metal objects). Further, there are many types of scrap, which may be melted, and which may vary in size from, for example, fine pieces sized 1 mm-5 cm to, for example, large blocks of pressed scrap sized from about 0.01 $m^3$ to 0.1 $m^3$. Further, the size of objects inserted through the side doors can be up to 3-4 meters long and may be even longer. Additionally the size of the furnace is not particularly limited and can, for example vary between 1 and 120 tons.

A second opening 140 is provided in a wall of the apparatus 105 proximate to the outlet chamber 125 to allow solid metal pieces to be inserted into the outlet chamber 125. Additionally, a door may be provided to cover the first opening 145 or the second opening 140 or both. The first opening 145 and second opening 140 may also be used to remove molten metal from the apparatus.

A charging window 150 is provided proximate to the vortex chamber 115 and may allow materials (such as lightweight scrap pieces and alloying components) to be inserted directly into the vortex chamber 115. As discussed above, many metals, such as aluminum, for example, undergo rapid oxidation when in a solid state with a large amount of surface area (e.g. swarf, foil, chips and so on). Oxidation losses during re-melting may be substantially reduced by rapidly submerging the solid metal pieces into the molten metal. Inserting solid metal materials (such as lightweight scrap) directly into the vortex chamber, while molten material is flowing through the vortex chamber, may allow the inserted solid metal materials to be submerged quickly. Thus oxidation may be reduced because the duration of time that the solid metal materials are exposed to the air is reduced due to the solid metal materials being submerged quickly.

The molten metal mover 110 moves molten metal from the inlet chamber 120 into the vortex chamber 115, pumping the molten material through an entrance channel 155 by applying a force (e.g., electromagnetic force) to the molten metal. The vortex chamber 115 and the entrance channel 155 of the vortex chamber 115 are located within the apparatus 105. The entrance channel 155 is exposed to the inlet chamber 120 to allow heat to be transferred from the first heating device 130 to the entrance channel 155.

An exit 160 is provided in the floor of the vortex chamber 115, and molten metal moved into the vortex chamber 115 by the molten metal mover 110 flows (e.g., drains) through the exit 160 into an exit channel 170 formed beneath the floor of the vortex chamber 115. The exit channel 170 fluidly communicates with the outlet chamber 125 and molten metal flowing through the exit channel 170 and into the outlet chamber 125.

The inlet chamber 120 and outlet chamber 125 may be separated by a partition 190 being formed between the inlet chamber 120 and the outlet chamber 125. An opening 165 may be formed in the partition 190 between the inlet chamber 120 and the outlet chamber 125 to allow molten metal to flow from the outlet chamber 125 into the inlet chamber 120 and be moved into the vortex chamber 115.

Within the inlet chamber 120, a transition ramp 175 may be formed to allow molten metal to flow up into the vortex chamber 115, which may include a floor having a height greater than the floor of the inlet chamber 120. Additionally, a wall 195 of the inlet chamber proximate to the entrance channel 155 of the vortex chamber 115 may have a curvilinear shape to direct the flow of molten metal into the entrance channel 155. Further, another wall of the inlet chamber 120 may have an angled region 180 and a curved region 185 to direct molten metal past the molten metal mover 110 and into the entrance channel 155 of the vortex chamber 115.

As shown by the arrows provided in FIG. 1, in some example embodiments, the entrance channel 155 may be positioned to direct a jet of molten metal substantially tangentially into the vortex chamber 115, which creates a vortex flow of the molten metal as the molten metal moves circularly within the vortex chamber 115. In some example embodiments, the curved inner walls inside of the circular shape of the vortex chamber 115 further direct the jet of molten metal around the circumference of the vortex chamber 115 to maintain vortex flow within the vortex chamber 115.

In some example embodiments, the metal mover 110 is not disposed within the vortex chamber 115. In these example embodiments, molten metal is moved by the metal mover 110 into the vortex chamber 115. Then, the molten metal flows due to a gravitation force into the exit channel 170 through the exit 160 formed in the bottom of the vortex chamber 115 based on a height differential between the floor of the outlet chamber 125 and the floor of the vortex chamber 115.

Additionally the floors of the inlet chamber 120 and the outlet chamber 125 may be located at the same height.

In example embodiments where the metal mover 110 is a flat inline inductor, the inductor may generate an alternating magnetic field which may apply a pressure to the liquid metal. Further, the pressure applied to the liquid metal causes the liquid metal to move in the direction along the travelling magnetic field of the inductor. The liquid metal flows up the transition ramp 175 and into the vortex chamber 115, causing the liquid level of the liquid metal in the vortex chamber 115 to increase. When the level of liquid metal in the vortex chamber 115 increases to a height greater than the level of liquid metal in the output chamber 125, the liquid metal moves through the exit 160, into the exit channel 170 and into the outlet chamber 125. This movement is caused by hydrostatic pressure. The foregoing example structure may allow movement of liquid metal within the vortex chamber without additional pumping units being required to provide movement of metal inside the vortex chamber.

Thus, in some of the example embodiments, the liquid metal is first pumped into the vortex chamber 115 by the molten metal mover (e.g. inductor) and then a gravitational force causes the liquid metal to move from the vortex chamber 115 because of level differences between the metal in the vortex chamber 115 and the metal in the outlet chamber 125. In such embodiments, metal can be transported to the vortex chamber 115 from the inlet chamber 120 via the transition ramp 175. When the molten metal mover operates, the molten metal mover generates a flow of metal from the inlet chamber to the vortex chamber. This flow of metal causes a rise in the metal level in the vortex chamber. As the metal level in the vortex chamber rises and becomes higher than the metal level in the outlet chamber, metal flows from the vortex chamber to the outlet chamber because of the level differences.

Alternative structures can also provide a way for metal to be transported into the vortex chamber 115 (such as a channel, or pipe, for example) to generate a pressure gradient between the vortex chamber 115 and the outlet chamber 125. In some example embodiments, the height of the floors of the outlet chamber 125, vortex chamber 115 and inlet chamber 120 may be the same or may be different. For example to avoid using the ramp 175, an example embodiment may provide a communication channel between the vortex chamber and the outlet chamber beneath the floors of both chambers. If the vortex chamber and the outlet chamber are the communicating vessels, then metal will move from one chamber to the next chamber, depending on relative floor heights of the chambers.

Figure 2:
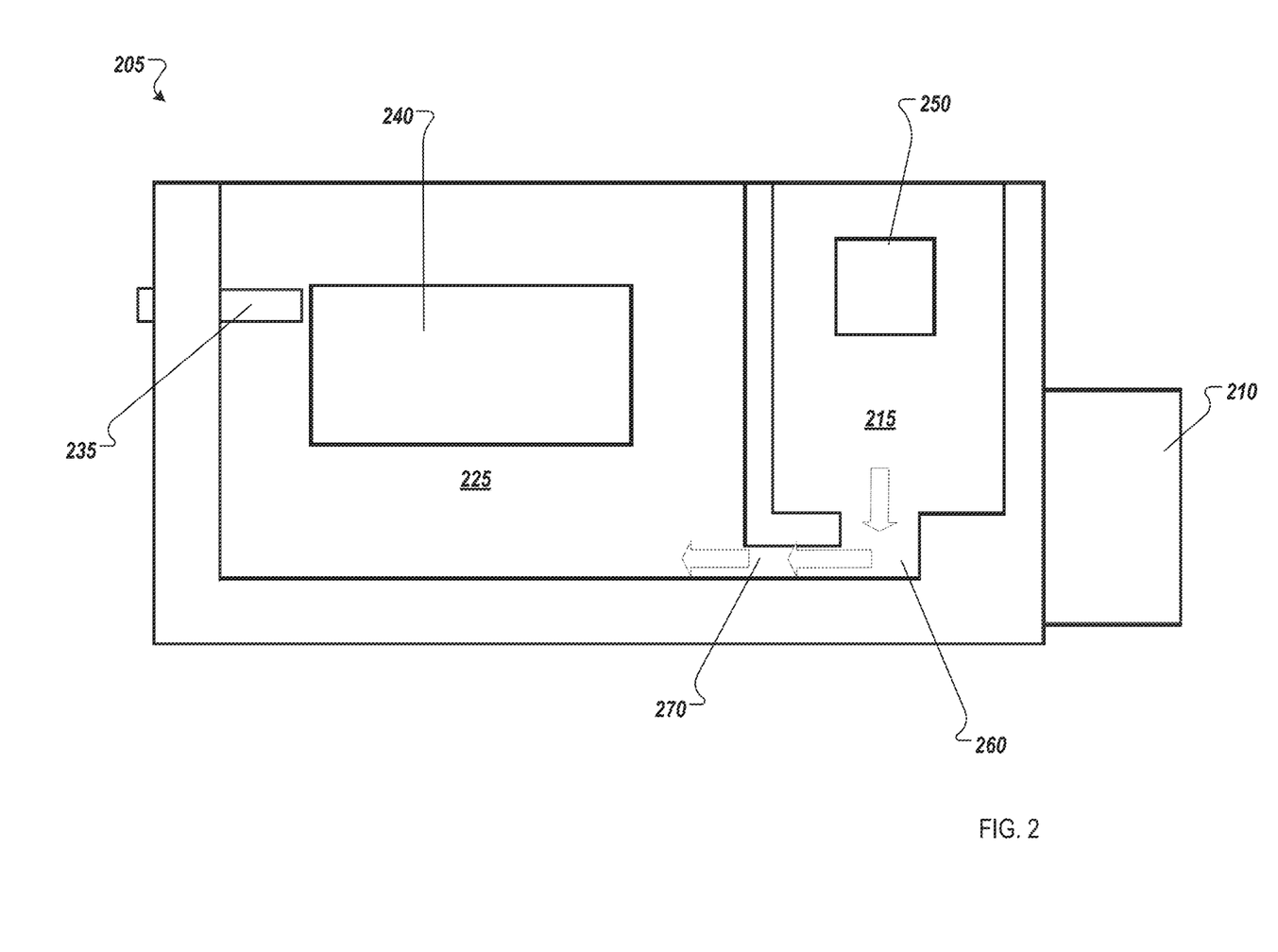
FIG. 2 illustrates a section view taken along line 2-2' of the apparatus according to the example embodiment.

FIG. 2 illustrates a section view taken along line 2-2' of the apparatus according to the example embodiment. Like elements have been numbered with similar reference numerals. In the section view of FIG. 2, the molten metal mover 210, the vortex chamber 215 and the outlet chamber 225 of the apparatus 205 are shown. Additionally, the fluid communication between the vortex chamber 215 and the outlet chamber 225 through the exit 260 and the exit channel 270 is shown. As mentioned above, the exit 260 is formed in the floor of the vortex chamber 215. Thus, molten metal moved into the vortex chamber 215 by the molten metal mover 210 may flow through the exit channel 270 into the outlet chamber 225. Arrows in FIG. 2 show molten metal flowing into the exit 260, through the exit channel 270 and into the outlet chamber 225.

In this example embodiment, the floor of the vortex chamber 215 is positioned at a height greater than the floor of the outlet chamber 225. The second heating device 235 attached to a sidewall above the floor of the outlet chamber 225 and can be used to heat and melt solid metal within the outlet chamber 225. Further, the second opening 240 is disposed in a wall of the outlet chamber 225 above the floor of the outlet chamber 225.

Further, a charging window 250 is formed in the wall of the vortex chamber 215 above the floor of the vortex chamber 215 to allow materials (such as lightweight scrap pieces and alloying components) to be inserted into the vortex chamber 215 and submerged.

Figure 3:
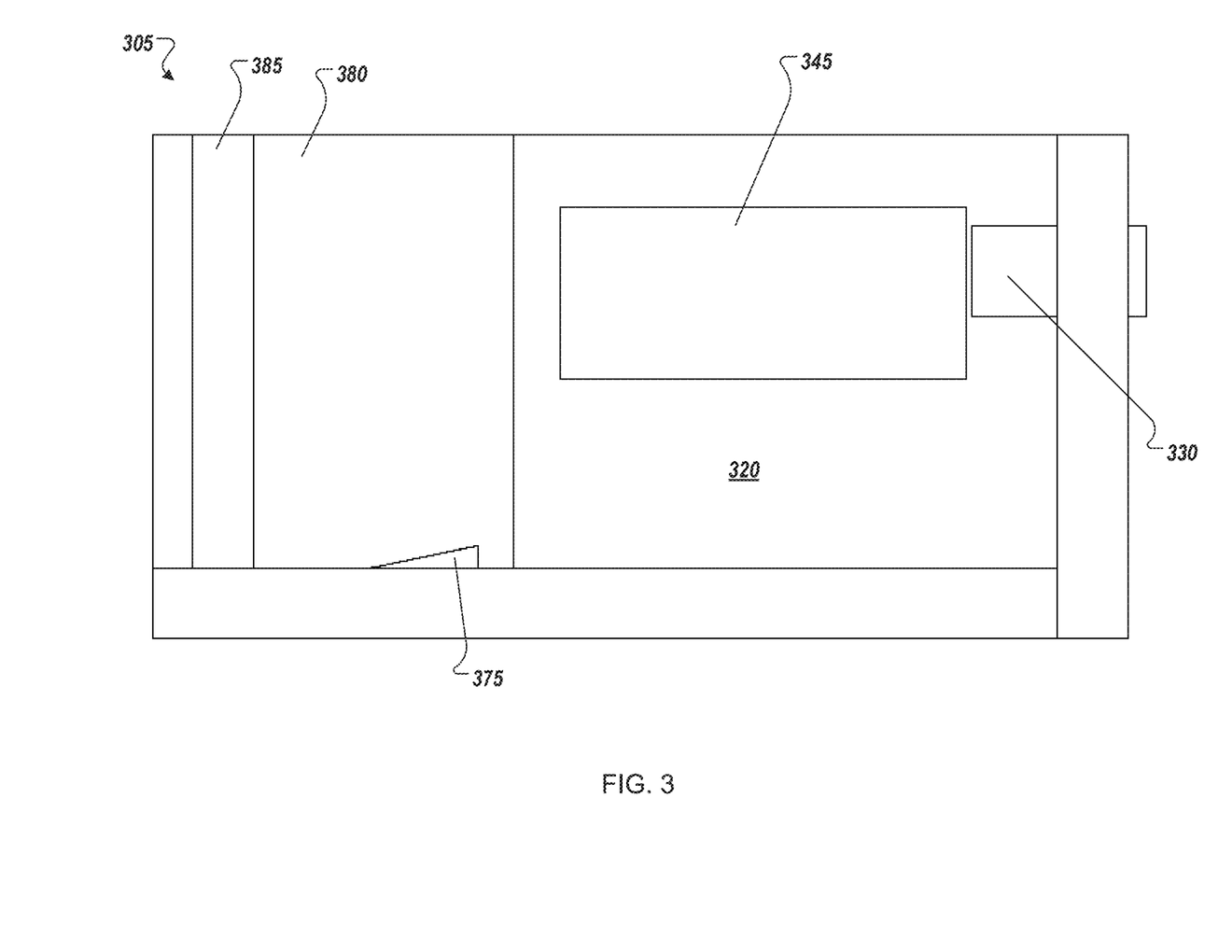
FIG. 3 illustrates a section view taken along line 3-3' of the apparatus according to the example embodiment.

FIG. 3 illustrates a section view taken along line 3-3' of the apparatus according to the example embodiment. Like elements have been numbered with similar reference numerals. In the section view of FIG. 3, the inlet chamber 320 of the apparatus 305 is shown. In this example embodiment, the first heating device 330 is attached above the floor of the inlet chamber 320 and can heat and melt solid metal within the inlet chamber 320. Further, the first opening 345 is disposed in a wall of the inlet chamber 320 is disposed above the floor of the outlet chamber 225. In this example embodiment, the side wall of the inlet chamber 320 having an angled region 380 and a curved region 385 to direct flow of molten metal within the inlet chamber 320. A portion of the transition ramp 375, which slopes up to floor of the vortex chamber (115 of FIG. 1), is also shown.

Figure 4:
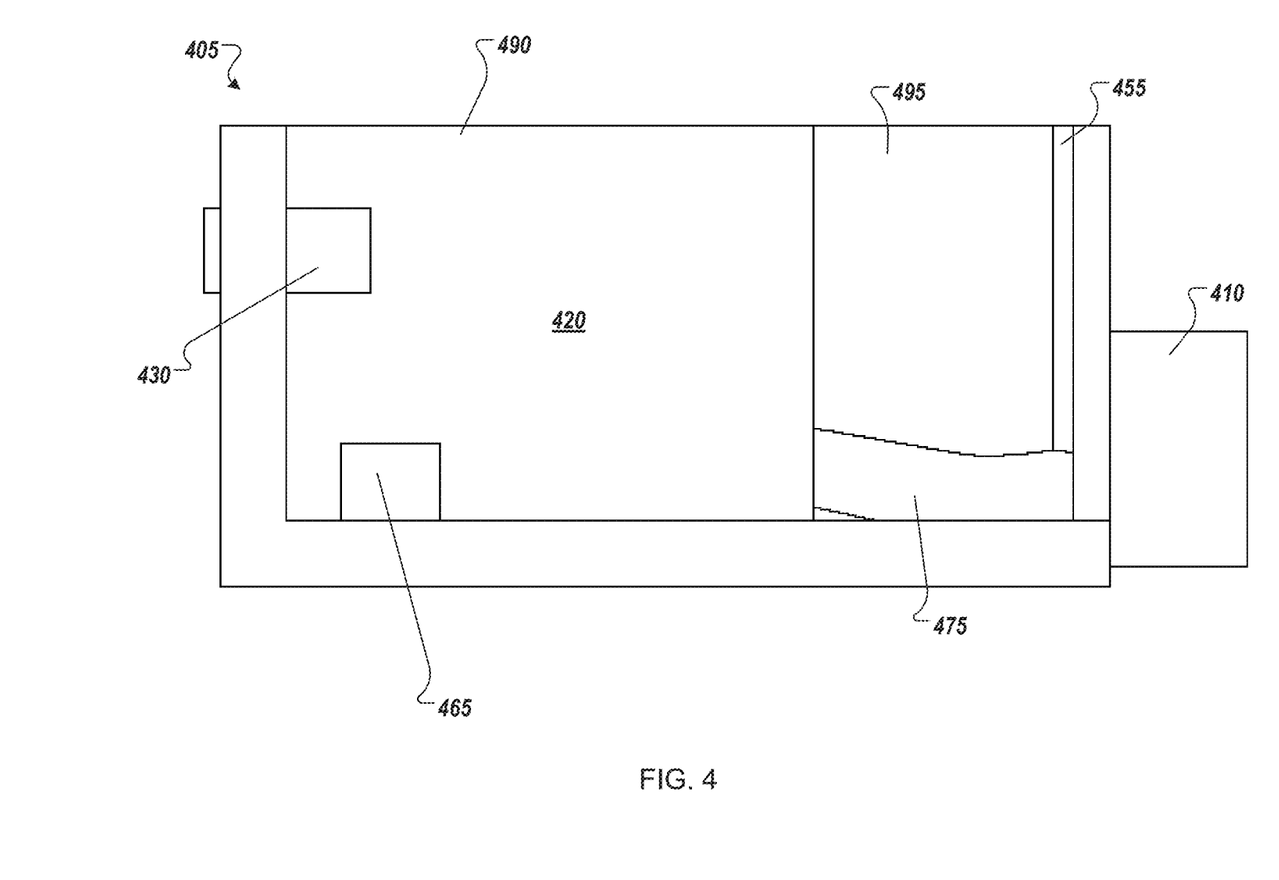
FIG. 4 illustrates a section view taken along line 4-4' of the apparatus according to the example embodiment.

FIG. 4 illustrates a section view taken along line 4-4' of the apparatus according to the example embodiment. Like elements have been numbered with similar reference numerals. In the section view of FIG. 4, the inlet chamber 420 and molten metal mover 410 of the apparatus 405 are shown. In this example embodiment, the first heating device 430 is attached above the floor of the inlet chamber 420 and can heat and melt solid metal within the inlet chamber 420. Additionally, an opening 465 formed in the partition 490 between the outlet chamber (not shown in FIG. 4) and the inlet chamber 420 is formed at a height substantially equal to a height of the floor of the inlet chamber 420. The transition ramp 475 between the inlet chamber 420 and the vortex chamber 115 of FIG. 1 slopes upward from the floor of the inlet chamber 420 along the curvilinear sidewall 495 toward the inlet channel 455 of the vortex chamber (not shown in FIG. 4).

Figure 5:
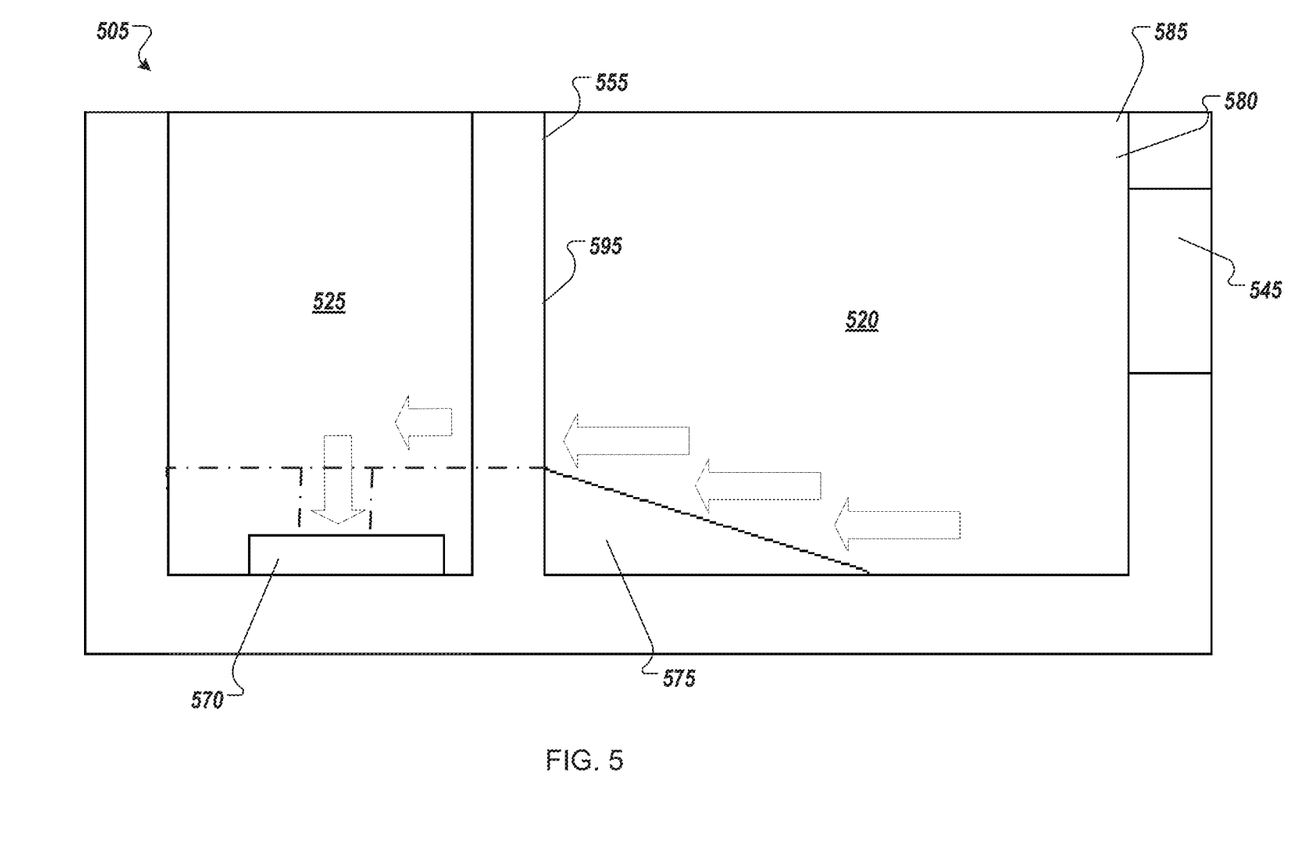
FIG. 5 illustrates a section view taken along line 5-5' of the apparatus according the example embodiment.

FIG. 5 illustrates a section view taken along line 5-5' of the apparatus according the example embodiment. Like elements have been numbered with similar reference numerals. In the section view of FIG. 5, the exit channel 570, inlet chamber 520 and the outlet chamber 525 of the apparatus 505 are shown. In this example embodiment, the floor of the inlet chamber 520 and the floor of the outlet chamber 525 have substantially equal heights. Additionally, the first opening 545 is disposed above the floor of the inlet chamber 520. The transition ramp 575 provides a sloped transition between the height of the floor of the inlet chamber 520 and the height of the vortex chamber (the floor of vortex chamber shown as a dot-dash line in FIG. 5), which is elevated above the floor of the inlet chamber. Additionally, the curved sidewall 595 proximate to the entrance channel 555 of the vortex chamber (not shown in FIG. 5) and the side wall having the angled region 580 and a curved region 585 are also shown. Arrows provided in FIG. 5 show the flow of molten metal via the transition ramp 575, into the vortex chamber (the floor of vortex chamber shown as a dot-dash line in FIG. 5), and into the exit channel 570

Figure 6:
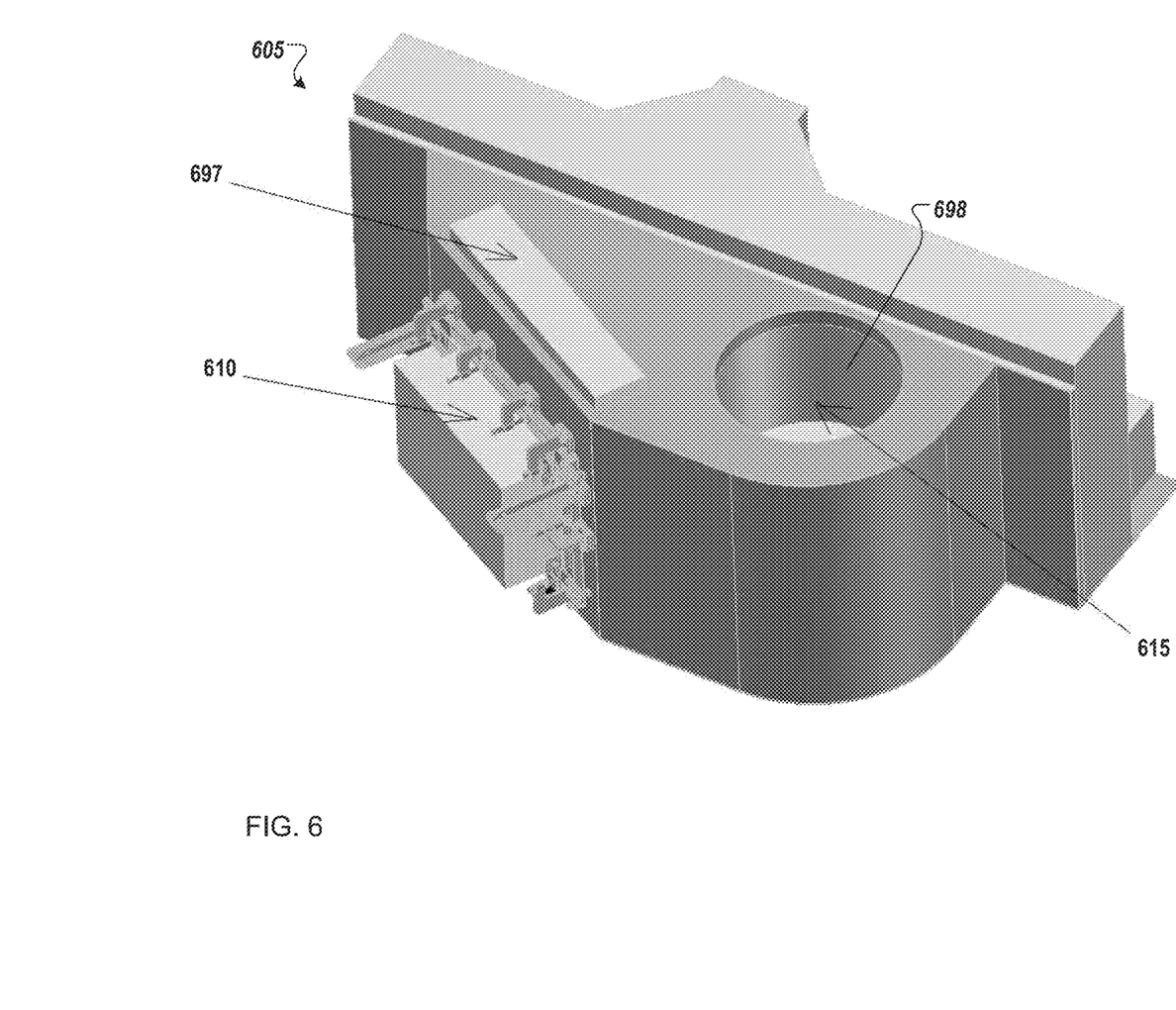
FIG. 6 illustrates a partial perspective view of an apparatus according to another example embodiment.

FIG. 6 illustrates a partial perspective view of an apparatus according to another example embodiment. Like elements have been numbered with similar reference numerals. In this perspective view, the exterior of the apparatus 605 is shown. The molten metal mover 610 is mounted to the external wall of the apparatus 605. In this example embodiment, a removable lid 697 is placed over the entrance channel (not shown in FIG. 6) of the vortex chamber 615. In this example embodiment, a charging window is not provided.

As an alternative to a charging window as disclosed above and illustrated in FIGS. 1-5, an opening 698 may be formed in the end face of the cylindrical shape of the vortex chamber 615 opposite to the end face in which the exit (160 in FIG. 1). Like the charging window discussed above, the opening 698 may allow materials (such as lightweight scrap pieces and alloying components) to be inserted directly into the vortex chamber 615. Additionally, the opening 698 being formed above the vortex chamber may allow observation of the inside of the vortex chamber during operation as well as maintenance access through the opening 698 without disassembly of the molten metal mover 610. Additionally, a removable lid 697 may allow access to the entrance channel (not shown in FIG. 6) for maintenance and cleaning without fully disassembling the apparatus 605 or removal of the molten metal mover 610.

Figure 7:
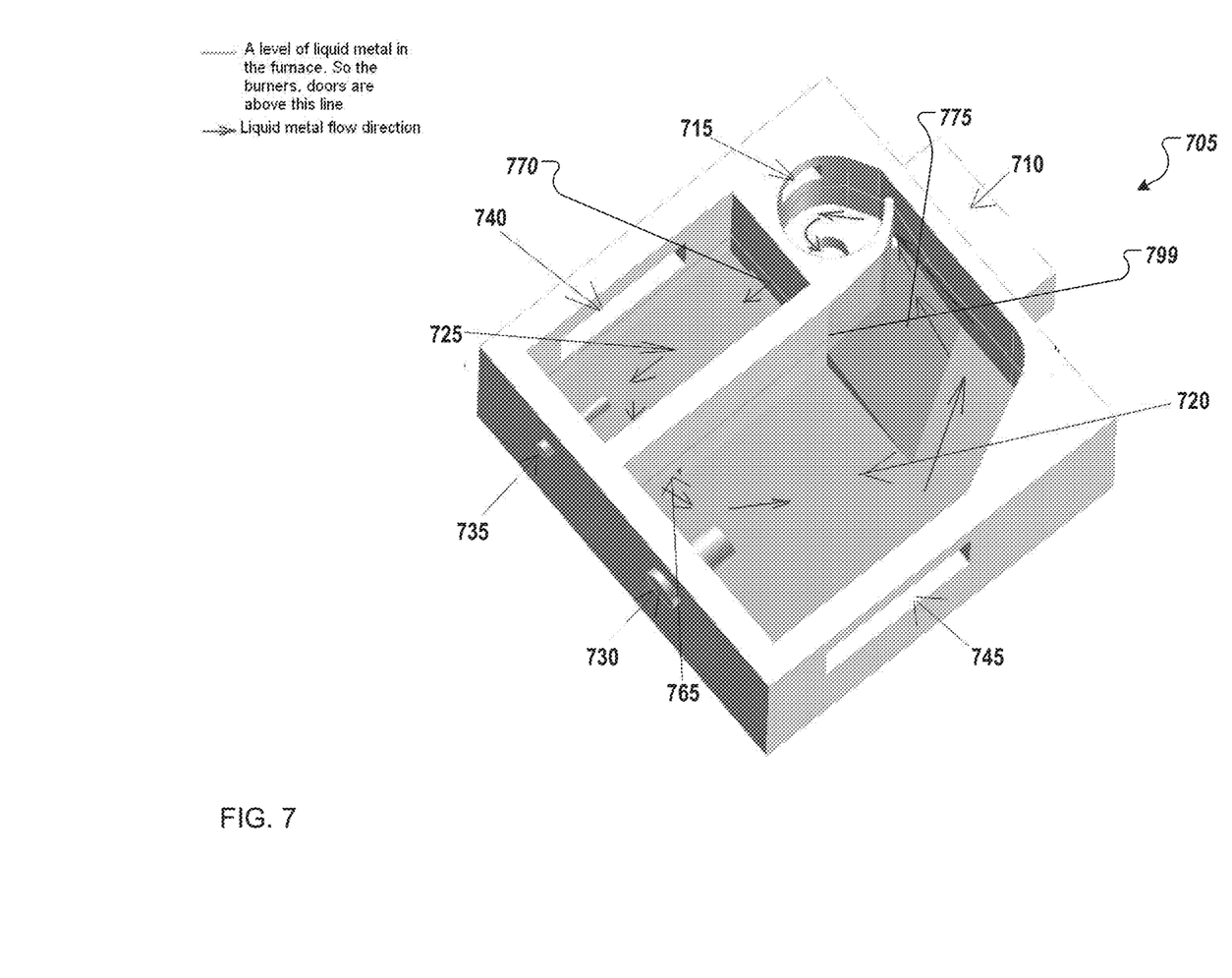
FIG. 7 illustrates molten metal flow through a perspective view of an apparatus according to an example embodiment.

FIG. 7 illustrates molten metal flow through a perspective view of an apparatus according to an example embodiment. Like elements have been numbered with similar reference numerals. In FIG. 7, arrows are provided to show the flow of liquid (molten) metal within the apparatus 705. In this example embodiment of the apparatus, pieces of solid metal can be inserted into the inlet chamber 720 and outlet chamber 725 through the first opening 740 and/or the second opening 740, respectively. Heat from at least one of the first heating device 730 and the second heating device 735 is applied to the solid metal pieces to increase the temperature of the pieces and cause the pieces to melt (e.g., enter a molten state).

When the metal reaches a molten state, the molten metal mover 710 causes the molten metal to be drawn up the transition ramp 775 and into the vortex chamber 715. As discussed above, the structure of the vortex chamber 115 may cause the molten metal to form a vortex as it flows through the vortex chamber. The first heating device 730 within the inlet chamber may continue to provide heat and maintain or increase the temperature of the molten metal. Within the vortex chamber 715, the molten metal flows in a spiral path down the exit (not labeled in FIG. 7) formed in the floor of the vortex chamber 715. As molten metal flows down the exit (not labeled in FIG. 7) of the vortex chamber, the molten metal flows out the exit channel 770 and into the outlet chamber 725.

Within the outlet chamber 725, additional heat may be applied to the molten metal by the second heating device 735 to maintain or increase the temperature of the molten metal. Molten metal within the outlet chamber 725 may flow into the inlet chamber 720 through the opening 765. Thus, molten metal may circulate throughout the apparatus (i.e. from the inlet chamber to the vortex chamber to the outlet chamber and back into the inlet chamber), while heat is applied by the first and second heating devices 730, 735.

In FIG. 7, a reference line 799 is also provided to show an example of the liquid level (i.e. level of molten metal) within the apparatus during operation. In this example embodiment, the first and second openings 745, 740 and the first and second heating devices 730, 735 are disposed above the liquid level 799.

An example embodiment may be made by laying a refractory lining inside of a metal casing. Then heat devices are fitted and doors for access, maintenance and loading material, and a drain hole to merge molten metal are formed. However, as would be understood by a person of ordinary skill in the art, alternative manufacturing methods could also be employed and the method of manufacturing is not particularly limited.

Although a few example embodiments have been shown and described, these example embodiments are provided to convey the subject matter described herein to people who are familiar with this field. It should be understood that the subject matter described herein may be embodied in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents. Further, any description of structural arrangement of components or relationship there between is merely for explanation purposes and should be used to limit an example embodiment.

Aspects related to the example embodiment have been set forth in part in the description above, and in part should be apparent from the description, or may be learned by practice of the invention. Aspects of the example embodiment may be realized and attained using the elements and combinations of various elements and aspects particularly pointed out in the following detailed description and the appended claims.

Further, in the example embodiments discussed above, solid metal pieces are melted to form molten metal. However, an example embodiment consistent with the present application is not limited to using metals or metallic materials, and example embodiments may be used to melt non-metallic solids as would be apparent to a person of ordinary skill in the art.

It is to be understood that both the foregoing descriptions are an example and are explanatory only and are not intended to be limiting.

What is claimed is:

1. An apparatus for melting a solid metal comprising:
   (A) a vortex chamber having an inlet and an outlet, and
   (B) a molten metal mover,
   wherein the apparatus further comprises a sidewall, the vortex chamber is enclosed by the sidewall, and the molten metal mover is mounted on an external part of the sidewall,
   the molten metal mover is configured to move molten metal within the apparatus into the vortex chamber,
   the molten metal mover is disposed proximate to the inlet of the vortex chamber,
   the molten metal mover is an inductor, and
   the apparatus further comprises an inlet chamber and an outlet chamber, wherein the inlet chamber is disposed adjacent to the outlet chamber with a partition formed there between, wherein the vortex chamber is disposed at one end of the outlet chamber and adjacent to inlet chamber, and an opening is formed in the partition between the inlet chamber and the outlet chamber.

2. The apparatus of claim 1, wherein the inductor can operate in a frequency range between 0 to 60 Hz, and is power regulated.

3. The apparatus of claim 1, wherein the vortex chamber is substantially cylindrical, and wherein the inlet is formed in a side wall of the substantially cylindrical vortex chamber and the outlet is formed in an end face of the substantially cylindrical vortex chamber.

4. The apparatus of claim 3, further comprising a charging window configured to allow solid metal pieces to be inserted into the vortex chamber disposed proximate to an end face of the substantially cylindrical vortex chamber opposite the end face of the substantially cylindrical vortex chamber in which the outlet is formed.

5. The apparatus of claim 3, wherein the vortex chamber is open to an atmosphere surrounding the apparatus through an opening formed in an end face of the substantially cylindrical vortex chamber opposite the end face of the substantially cylindrical vortex chamber in which the outlet is formed.

6. The apparatus of claim 5, further comprising a removable lid configured to provide access to the inlet of the vortex chamber when the removable lid is removed, and to prevent access to the inlet of the vortex chamber when the removable lid is not removed.

7. The apparatus of claim 1, further comprising a removable lid configured to provide access to the inlet of the vortex chamber when the removable lid is removed and to prevent access to the inlet of the vortex chamber when the removable lid is not removed.

8. The apparatus of claim 1, further comprising a charging window to introduce solid metal pieces into the vortex chamber disposed proximate to the vortex chamber.

9. The apparatus of claim 1, wherein a floor of the vortex chamber is positioned at a height higher than a floor of the outlet chamber,
wherein the outlet of vortex chamber is disposed in the floor of the vortex chamber, and
wherein the outlet of the vortex chamber is connected to the outlet chamber by a channel disposed beneath the floor of the vortex chamber.

10. The apparatus of claim 9, wherein the floor of the vortex chamber is positioned at a height higher than a floor of the outlet chamber,
wherein the inlet of the vortex chamber is formed in a sidewall of the vortex chamber,
wherein a transition ramp is disposed in the inlet chamber proximate to the inlet of the vortex chamber, and
wherein the transition ramp bridges a difference in height between the floor of the inlet chamber and the vortex chamber.

11. The apparatus of claim 1, wherein a first heating device to heat the inlet chamber is provided in the inlet chamber.

12. The apparatus of claim 11, wherein a second heating device to heat the outlet chamber is provided in the outlet chamber.

13. The apparatus of claim 12, wherein a first opening to insert solid metal pieces into the inlet chamber is disposed in a side wall of the inlet chamber.

14. The apparatus of claim 13, wherein a second opening to insert solid metal pieces into the outlet chamber is disposed in a side wall of the outlet chamber.

15. The apparatus of claim 1, wherein the apparatus further comprises an inlet chamber, and a first heating device to heat the inlet chamber is provided in the inlet chamber.

16. The apparatus of claim 1, wherein the apparatus further comprises an outlet chamber, and a second heating device to heat the outlet chamber is provided in the outlet chamber.

17. The apparatus of claim 1, wherein the apparatus further comprises an inlet chamber, and a first opening to insert solid metal pieces into the inlet chamber is disposed in a side wall of the inlet chamber.

18. The apparatus of claim 1, wherein the apparatus further comprises an outlet chamber, and a second opening to insert solid metal pieces into the outlet chamber is disposed in a side wall of the outlet chamber.

19. The apparatus of claim 1, wherein the vortex chamber is defined by a housing.

20. The apparatus of claim 1, wherein the metal mover directs the molten metal through the inlet, causing the molten metal to enter the vortex chamber tangentially.

21. The apparatus of claim 1, further wherein the vortex chamber is open to an atmosphere surrounding the apparatus through an opening formed through a side of the vortex chamber.

* * * * *